United States Patent [19]

Björklund

[11] Patent Number: 4,477,543
[45] Date of Patent: Oct. 16, 1984

[54] ACTIVATEABLE BATTERY

[75] Inventor: Jan M. V. Björklund, Järfälla, Sweden

[73] Assignee: U.S. Philips Corporation, New York, N.Y.

[21] Appl. No.: 562,325

[22] Filed: Dec. 16, 1983

[30] Foreign Application Priority Data

Dec. 30, 1982 [SE] Sweden ............................ 8207499

[51] Int. Cl.³ .............................................. H01M 6/36
[52] U.S. Cl. ..................................... 429/115; 429/116
[58] Field of Search ................................. 429/115, 116

[56] References Cited

U.S. PATENT DOCUMENTS

| 3,653,973 | 4/1972 | Broglid ............................. 429/116 |
| 3,827,914 | 8/1974 | Kaye ................................. 429/116 |
| 4,048,396 | 9/1977 | Hollander, Jr. ..................... 429/116 |
| 4,049,888 | 9/1977 | Flender ........................... 429/116 X |

Primary Examiner—Charles F. LeFevour
Attorney, Agent, or Firm—Norman N. Spain

[57] ABSTRACT

Figure 1:
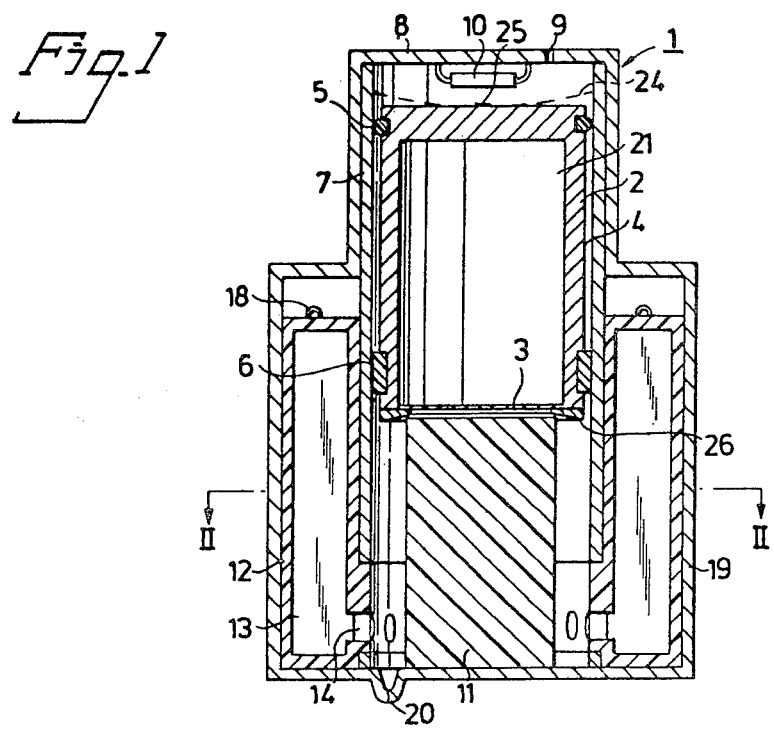

The invention relates to an activateable battery (1) comprising a container of electrolyte (2) which when activated is pressed down over a tap (11) adapted to the container. During the moving of the container down over the tap (11) electrolyte (21) is pressed out of the container (2) and via cell openings (14) into cells (13). The container tightens the cell openings (14) in its lower end position. The battery is enclosed under vacuum. According to the invention an activateable battery is obtained which not need any rotation and which may contain several separate battery cells. Such a battery is useable within the ammunition field and especially in grenade thrower ammunition and ammunition which is controlled in its final phase (FIG. 1).

9 Claims, 4 Drawing Figures

ACTIVATEABLE BATTERY

The invention refers to an activateable battery comprising a sleeve, a container of electrolyte having a bottom provided with a membrane and being arranged within the sleeve, and one or more cells arranged in connection with the sleeve.

From, for example, Swedish patent application No. 328.223 a battery is known, in which an glass ampoule with electrolyte is moved and opened by crushing the glass against percussion device. Glass particles are then mixed with the electrolyte and therefore problems may occur when the electrolyte is to be transferred into the cells. In order to fill the battery cells it is necessary to subject the electrolyte to a centrifugal force, which forces the electrolyte into the peripherical situated cells. This centrifugal force is obtained by rotating the battery. Hence, such a battery is only suitable, for use in an equipment, which when used is subjected to a rotation, as in projectiles rotating during their flight. as in projectiles rotating during their flight.

A known battery which is independent of rotation comprises a container of electrolyte provided with a membrane, which membrane bursts when the membrane is subjected to an axial acceleration. The bursting of the membrane is caused by an inert body with a piston effect, the body being moved during the acceleration. In this construction, however, the electrolyte container of the battery is not moved and the battery only contains one single cell.

It is an object of the invention to provide a battery not requiring any rotation and which may contain several separate battery cells. Accordingly, the invention is characterized in that the container of electrolyte in a non-activated state is arranged in an upper end position above a tap situated in the lower region of the sleeve, which tap is adapted to the inner volume of the container of electrolyte, and that the container of electrolyte when activated is pressed down over the tap, the electrolyte being pressed out of the container of electrolyte and via cell openings into the cells when the container of electrolyte is moved down over the tap, and the container of electrolyte occupying a lower position after its moving down over the tap.

In certain constructions, for instance in case the cells should be mutually connected in series only, it is important that in the activated state the battery cells are not connected by electrolyte passages between the cells. Accordingly, one favourable embodiment of the invention is characterized in that the container of electrolyte in its lower end position closes the cell openings. This may be obtained by means of a sealing ring. Hence, this embodiment accordiing to the invention is further characterized in that the container of electrolyte is provided with a sealing ring adjacent to the lower region of the container in order to tighten the cell openings when the container is in its lower end position.

By closing the cells and the sleeve under vacuum, the tendency of any compressed air that arises to press the electrolyte out of the cells is prevented. According to another favourable embodiment the invention is characterized in that the cells and the sleeve are under vacuum.

Figure 2:
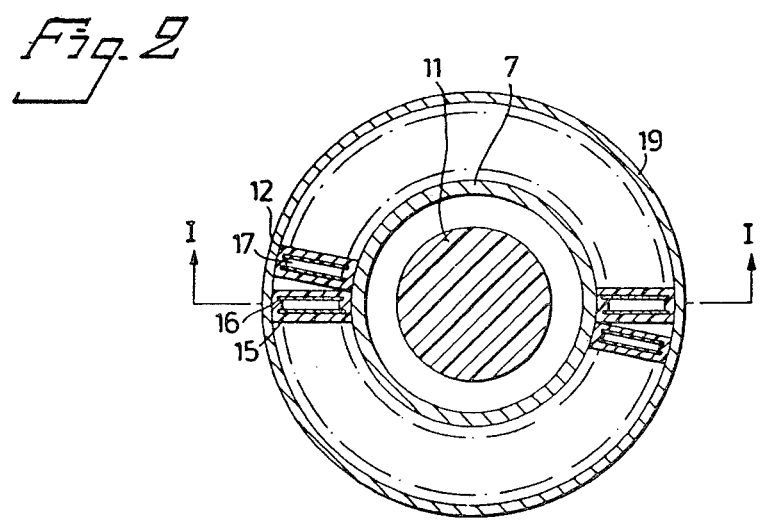
Figure 3:
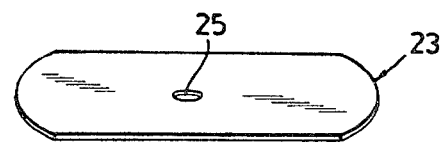
Figure 4:
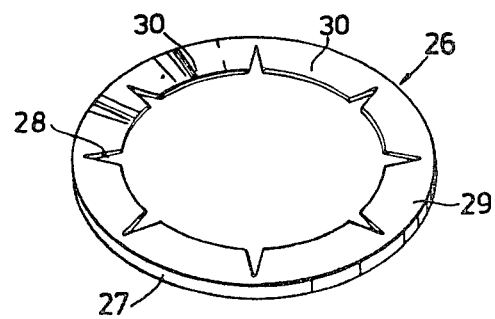

The invention will be described in more detail with reference to the drawing, in which FIG. 1 shows a longitudinal sectional view of a battery according to the invention taken along the sectional line I—I in FIG. 2, FIG. 2 shows a cross section view of the battery taken along the sectional line II—II in FIG. 1, FIG. 3 shows a locking means in order to lock the container of electrolyte in a lower end position within the battery according to the invention, and FIG. 4 shows means for preventing an unintentional activation of the battery according to the invention.

The battery 1 comprises a cylinder-shaped container of electrolyte 2 provided with a thin membrane 3 at its lower end surface. The container 2 with accompanying membrane 3 are preferably made of copper. The container 2 contains a suitable electrolyte 21, for example, a $HBF_4$ solution. An upper and a lower sealing ring 5 and 6, made of, for example, a fluorelastomer, such as a copolymer of vinylidenefluoride and hexafluoropropylene are situated on the outer surface of the container 2.

The container 2 of electrolyte 21 is accommodated within a cylinder-shaped sleeve 7. The upper end of the sleeve 7 is closed and it may be provided with inlets for release mechanisms in the form of a gas generator, a bursting charge etc. The container 2 of electrolyte 21 is coaxially arranged relative to the sleeve 7 in its upper region and with the membrane 3 directed downwards. In the lower region of the sleeve 7 there is a tap 11, preferably of synthetic resin. The tap 11 has a form which is adapted to the inner volume of the container 2 of electrolyte 21 and consists of a cylindrical body with a diameter which is somewhat less than the inner diameter of the container 2 and with a length which preferably is somewhat smaller than the internal length of the container. However, it is possible to have such small differences in length and diameters that the volume of the container 2 an the tap 11 is substantially the same. Several cells 13 are positioned around the periphery of and essentially axially parallel to the sleeve 7. These cells 13 are connected to the space within the sleeve 7 through openings 14. Each of the cells 13 are enclosed in a container 12 of a synthetic resin or a similar material and consists of two parallel electrolytic plates 15, 16 with an intermediate electrolyte space 17 (FIG. 2). The electrolytic plates 15, 16 may comprise Pb and $PbO_2$, respectively. In order to electrically connect those cells 13 the electrolytic plates are provided with connecting leads 18. The sleeve 7, the container 2 of electrolyte 21 and the cells 13 are enclosed within an air proof casing 19, optionally via a, not shown, plate attached between the bottom of the casing and the bottom of the cells.

The battery may be activated by releasing gas from a gas-generator 10 or a blasting charge 10 which operates in the space between the upper end of the sleeve 7 and the upper end of the container 2 of electrolyte 21 and presses the container 2 down over the tap 11 or by subjecting the battery 1 to an axial acceleration which tends to pull the container 2 down over the tap 11. In the beginning of the movement of the container 2 the membrane 3 of the container 2 is broken up by the tap 11. During the continued movement of the container 2 towards the bottom of the sleeve 7 the tap 11 presses electrolyte 21 out of the container 2 and via cell openings 14 which are situated at the bottom end of the cells 13 into the cells 13. The amount of electrolyte 21 in the container 2 is so adapted that the cells 13 are completely filled.

The sealing rings 5, 6 seal the container 2 to the sleeve 7 and also serve as guiding means for the container during the moving of the container. The sealing by the lower ring 6 prevents electrolyte 21 from flowing into the space between the envelope surface 4 of the container 2 and the sleeve 7. The upper ring 5, on the other side, prevents eventual over-pressure in the space between the end of the sleeve 7 and the upper end of the electrolyte container 2 from causing electrolyte 21 to flow between the envelope surface 4 of the container 2 and the sleeve 7. When the container reaches its lower end position, the stop position, its lower sealing ring 6 tightens against the openings 14 of the cells 13, so that electrolytic connections between the cells 13 are prevented.

The container 2 is maintained in the lower end position by means of a gas pressure or by means of mechanical locking. In a simple embodiment the sealing rings 5, 6 may serve as locking means. Another suitable locking means is shown in FIG. 3. The locking means consists of a resilient plate 23, for example of metal, which is clamped in the way indicated by the broken line 24 in FIG. 1, that is with its concave side directed towards the upper end of the sleeve 7 and its convex side directed towards the container 2. The central part 25 of the plate is fixed upon the center of the upper end surface of the container 2. This locking means prevents a movement of the container 2 towards the upper end of the sleeve 7 because the ends of the resilient plate 23 firmly engage with the inner wall of the sleeve 7 at such a moving attempt. On the other hand the container 2 may be moved downwards towards its end position, because then the ends of the plate 23 can slide along the inner wall of the sleeve 7.

The battery can be provided with means for preventing an unintentional activation of the battery. Such means are shown in FIG. 4 in more detail, it consists of an annular device 26, which is situated parallel to and adjacent to that end of the container 2 provided with the membrane 3. The annular device 26 comprises an annular element 29 provided with notches 28 and the device is fixed on the periphery of the container via the annular rim 27. The container may rest on and be maintained in a non-activated position by means of the annular device 26 as long as it is not subjected to forces in the magnitude of the forces at hand during intentional activation. When an intentional activation occurs the tongues 30 of the annular element provided with notches are bent away and the container 2 is brought down over the tap 11.

A battery of the described kind is useable within several fields. However, it is particularly suitable for use in grenade thrower ammunition and ammunition which is controlled in its final phase and in such other projectiles which do not rotate during flight.

What is claimed is

1. An activateable battery comprising a sleeve, a container of electrolyte having a bottom provided with a membrane and being arranged within the sleeve, and one or more cells arranged in connection with the sleeve, characterized in that the container of electrolyte in a non-activated state is arranged in an upper end position above a tap situated in the lower region of the sleeve, which tap is adapted to the inner volume of the container of electrolyte, and that the container of electrolyte when actived is pressed down over the tap, the electrolyte being pressed out of the container of electrolyte and via cell openings into the cells when the container of electrolyte is moved down over the tap, and the container of electrolyte occupying a lower end position after its moving down over the tap said container in its lower end position closes the cell openings.

2. A battery as claimed in claim 1, characterized in that the cells and the sleeve are under vacuum.

3. A battery as claimed in claim 1, characterized in that the container of electrolyte is provided with a sealing ring adjacent to the lower region of the container in order to close the cell openings when the container occupies its lower end position.

4. A battery as claimed in any of the preceeding claims, characterized in that the container of electrolyte and the tap are so positioned mutually and to the cells that the cells are completely filled when the container occupies its lower end position.

5. A battery as claimed in claim 4, characterized in that the container of electrolyte is maintained in its lower end position by means of a gas pressure in the space between the upper end of the sleeve and the upper end of the container and/or by means of mechanical locking means.

6. a battery as claimed in claim 4, characterized in that the battery comprises means for preventing unintentional activation of the battery.

7. A battery as claimed in claim 4, characterized in that the container of electrolyte is provided with a seal-order to seal the container of electrolyte to the sleeve and to guide the container.
and the sleeve and to guide the container.

8. A battery as claimed in claim 4, characterized in that the sleeve and the container of electrolyte have a cylindrical form and that the cells are around the periphery of the sleeve in an essentially coaxially parallel manner to the sleeve.

9. A battery as claimed in claim 4, characterized in that the battery is activated by means of a gas generator or blasting charge operating in the space between the upper end of the sleeve and upper end of the container of electrolyte to press the container down over the tap and/or by subjecting the battery to an axial acceleration, pressing the container down over the tap.

* * * * *